(12) United States Patent
Assoolin et al.

(10) Patent No.: US 12,188,860 B2
(45) Date of Patent: Jan. 7, 2025

(54) DEVICE AND METHOD FOR SPECTRAL ANALYSIS OF A COMPOUND SPECIMEN (71) Applicant: NewSight Imaging Ltd., Ness Ziona (IL)

(72) Inventors: Eli Assoolin, Ness Ziona (IL); Eyal Yatskan, Ness Ziona (IL); Lital Cohen-Blum, Ness Ziona (IL); Erez Lev, Ness Ziona (IL)

(*) Notice: Subject to any disclaimer, the term of this patent is extended or adjusted under 35 U.S.C. 154(b) by 16 days.

(21) Appl. No.: 17/998,042

(22) PCT Filed: Jul. 6, 2021

(86) PCT No.: PCT/IB2021/056060
§ 371 (c)(1),
(2) Date: Nov. 7, 2022

(87) PCT Pub. No.: WO2021/224900
PCT Pub. Date: Nov. 11, 2021

(65) Prior Publication Data
US 2023/0175953 A1 Jun. 8, 2023

Related U.S. Application Data (60) Provisional application No. 63/021,367, filed on May 7, 2020.

(51) Int. Cl.
*G01N 21/25* (2006.01)
*G01N 21/64* (2006.01)

(52) U.S. Cl.
CPC ... *G01N 21/255* (2013.01); *G01N 2021/6471* (2013.01)

(58) Field of Classification Search
CPC ......... G01N 21/255; G01N 2021/6471; G01N 2021/1734; G01N 2021/174; G01N 21/645
See application file for complete search history.

(56) References Cited

U.S. PATENT DOCUMENTS

| | | | |
|---|---|---|---|
| 6,323,944 B1 * | 11/2001 | Xiao | G01J 3/0256 356/417 |
| 2015/0092200 A1 * | 4/2015 | Zahniser | G01N 33/49 356/627 |
| 2015/0377774 A1 * | 12/2015 | Saptari | G01N 21/359 356/70 |

(Continued)

FOREIGN PATENT DOCUMENTS

| | | | | |
|---|---|---|---|---|
| DE | 102014108138 A1 * | 12/2015 | | G01J 3/0208 |
| WO | WO-2019021275 A1 * | 1/2019 | | A01K 43/04 |

*Primary Examiner* — Tarifur R Chowdhury
*Assistant Examiner* — Kemaya Nguyen
(74) *Attorney, Agent, or Firm* — PatShegen IP; Moshe Pinchas (57) ABSTRACT

A device for spectral analysis including a seat for holding therein a compound specimen; a light source for illuminating the compound specimen with a spectrum of light; and a detector configured for detecting light transmitted through or reflected from the biological sample, the detector including a pixel array having a plurality of pixels each of which being configured to detect intensity of one wavelength within the spectrum such that the pixel array obtains a spectral signature of the biological sample including intensities of wavelengths within the spectrum.

17 Claims, 10 Drawing Sheets

(56) References Cited

U.S. PATENT DOCUMENTS

2017/0234729 A1* 8/2017 Goldring ............... G01J 3/0208
356/51
2018/0224334 A1* 8/2018 O'Rourke ............ G01N 21/274
2022/0247962 A1* 8/2022 Maruyama ........... G01N 21/645
2023/0108409 A1* 4/2023 Deliwala ............... G01J 3/2823
382/128

* cited by examiner

DEVICE AND METHOD FOR SPECTRAL ANALYSIS OF A COMPOUND SPECIMEN

FIELD OF INVENTION

The presently disclosed subject matter relates to method and apparatus for spectral analysis of a compound specimen in general and in particular biological samples.

BACKGROUND

Spectrophotometry is a tool that hinges on the quantitative analysis of molecules depending on how much light is absorbed by colored compounds. Spectrophotometry uses photometers, known as spectrophotometers, that can measure a light beam's intensity as a function of its color (wavelength). Important features of spectrophotometers are spectral bandwidth (the range of colors it can transmit through the test sample), the percentage of sample-transmission, the logarithmic range of sample-absorption, and sometimes a percentage of reflectance measurement.

SUMMARY OF INVENTION

There is provided according to one aspect of the presently disclosed subject matter a device for spectral analysis. The device includes a seat for holding therein a compound specimen; a light source for illuminating the compound specimen with a spectrum of light; and a detector configured for detecting light transmitted through or reflected from the biological sample, the detector including a pixel array having a plurality of pixels each of which being configured to detect intensity of one wavelength within the spectrum such that the pixel array obtains a spectral signature of the biological sample including intensities of wavelengths within the spectrum.

The light source can be disposed on a first side of the seat and the detector is disposed on a second side of the seat such that an optical path is formed between the light source and the detector.

The detector can include an array of pixels arranged along the length of the detector, each of the pixels is configured to detect a certain wavelength within the spectrum, such that the entire array of pixels is configured to provide information regarding each wavelength within the spectrum.

The detector can include a band pass filter disposed along the array of pixels and being configured to filter various wavelengths of the spectrum such that each of the pixels on the array of pixels receives light of a certain wavelength or bandwidth.

The apparatus can further include an optical guiding member for directing illumination from the light source to the seat and the cuvette and being configured to form an even and orthogonal illumination, such that the cuvette is evenly illuminated.

The optical guiding member can include an array of blocking walls each having an elongated slit extending along length of the cuvette such that light arrays which are not directed orthogonally to the cuvette are blocked by one of the blocking walls.

The detector can be provided with a linear filter configured such that each location along a first dimension of the linear filter allows transmitting light of a single wavelength or a narrow bandwidth of wavelengths.

The linear filter can include a first filter and a second filter, disposed in parallel to one another and in parallel with the pixel array, the first and second filters are disposed with respect to one another, such that each location along a first dimension of the first filter is configured to transmit the same wavelength as corresponding location along first dimension of the second filter.

The first and second filters can be disposed with a space between one another, the space extends the optical path such that oblique light rays from the first filter strike the second filter at a location in which the oblique light rays are blocked.

The linear filter can include a first filter and a second filter, disposed in parallel to one another and in parallel with the pixel array, the first and second filters are disposed with respect to one another, such that each location along a first dimension of the first filter is configured to transmit the same wavelength as corresponding location along first dimension of the second filter.

The linear filter can include a first filter and a second filter disposed along an optical path formed between the light source and the detector, the first filter is disposed with a shift with respect to the second filter.

The apparatus can further include a controller configured for analyzing a spectral signature of the biological sample, the controller is configured for obtaining the spectral signature and for extracting characterizing features of the spectral signature.

The characterizing features can be light properties, of predetermined wavelengths in the illuminated spectrum.

The controller can be configured for comparing the characterizing features with corresponding features stored in a database.

There is provided in according with another aspect of the presently disclosed subject matter a method for spectral analysis of a biological sample. The method includes illuminating the biological sample with a spectrum of light; and disposing a detector for detecting light transmitted through or reflected from the biological sample, the detector including a pixel array having a plurality of pixels each of which being configured to detect intensity of one wavelength within the spectrum such that the pixel array obtains a spectral signature of the biological sample including intensities of wavelengths within the spectrum.

The method can further include obtaining a spectral signature of the biological sample and extracting characterizing features of the spectral signature.

The method can further include comparing the characterizing features with corresponding features stored in a database.

The method can further include calibrating the detector by a calibrating filter configured to transmit filtered light of certain wavelength or spectrum of wavelength and determining location of at least two pixels in the detector which detect the filtered light.

Compound specimen, as used hereinafter in the specification and claims refers to a specimen containing compounds of molecules, chemical substances, such as liquids, or biological samples, for example serum or other substances containing viruses etc.

BRIEF DESCRIPTION OF THE DRAWINGS

In order to understand the disclosure and to see how it may be carried out in practice, embodiments will now be described, by way of non-limiting examples only, with reference to the accompanying drawings, in which.

DETAILED DESCRIPTION OF EMBODIMENTS

Figure 1:
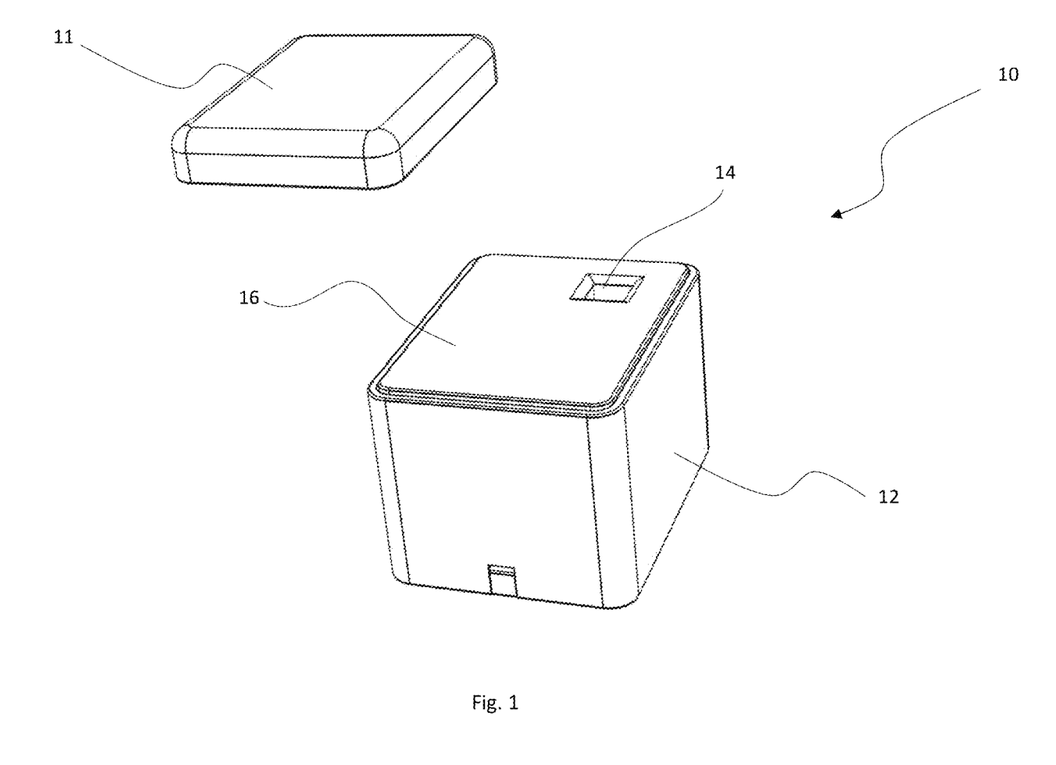
FIG. 1 is a side perspective view of a device for spectral analysis.
Figure 2:
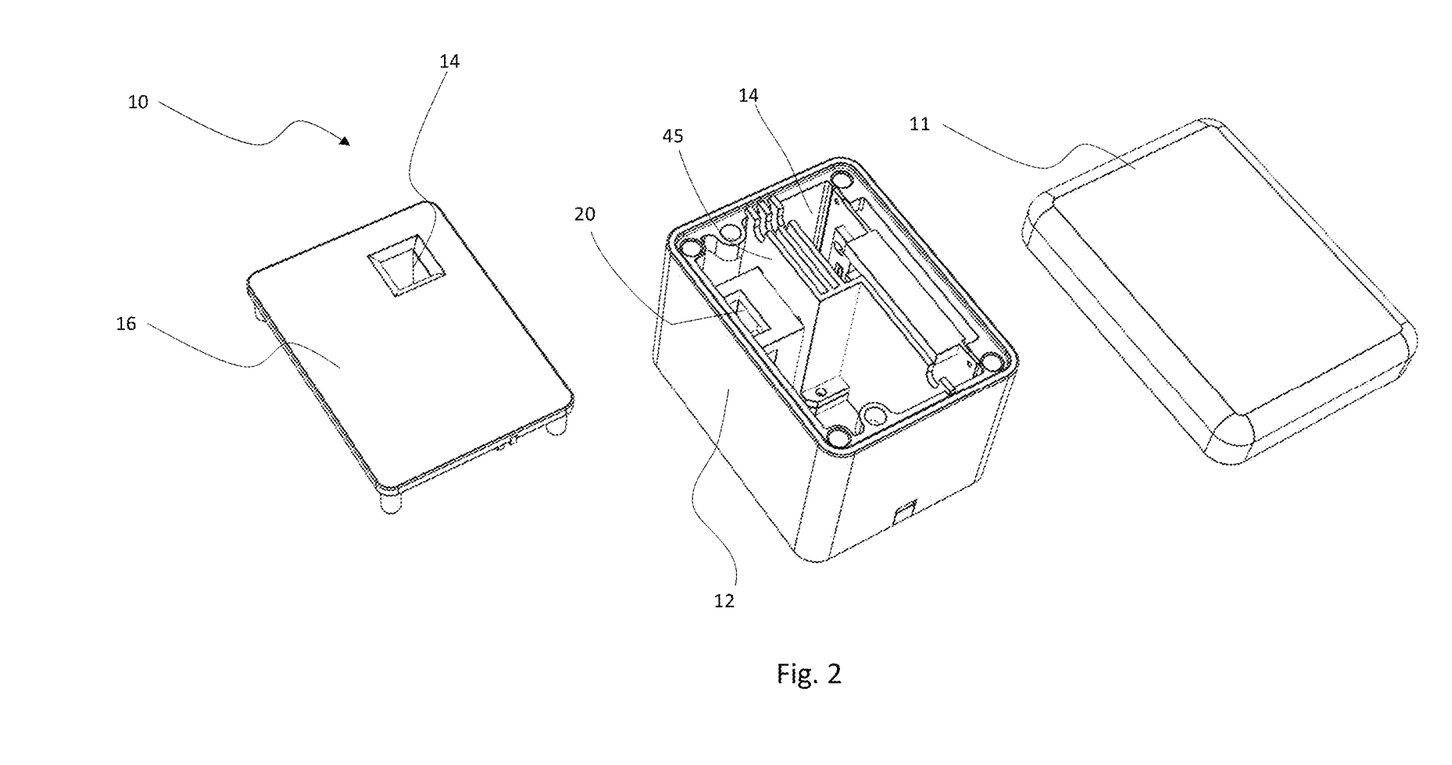
FIG. 2 is a side perspective view of the device of FIG. 1 with the top portion thereof removed.

As shown in FIGS. 1 and 2, the device 10 for biological spectral analysis can include a housing 12 having a seat 14 configured for holding therein a cuvette including a compound specimen, such as biological sample, and an optical system 25 for analyzing the biological sample. The housing further includes a top portion 16 having an aperture 18 configured for allowing inserting the cuvette into the seat 14.

As shown in FIGS. 2 and 3A-3C, the optical system 25 includes a light source 20 disposed on a first side of the seat 14 and a detector 30 disposed on a second side of the seat 14, such that an optical path is formed between the light source 20 and the detector 30. The light source 20 is configured to illuminate cuvette with light of a predetermined spectrum, the detector 30 on the other hand, is configured to detect wavelengths within the illuminated spectrum.

The device 10 can further include a lid 11 for covering the cuvette when disposed inside the seat 14 so as to block outside light from interfering in the spectral analysis.

According to an example, the detector 30 includes an array of pixels arranged along the length of the detector 30, each of the pixels is configured to detect a certain wavelength within the spectrum, such that the entire array of pixels is configured to provide information regarding each wavelength within the spectrum.

Figure 4A:
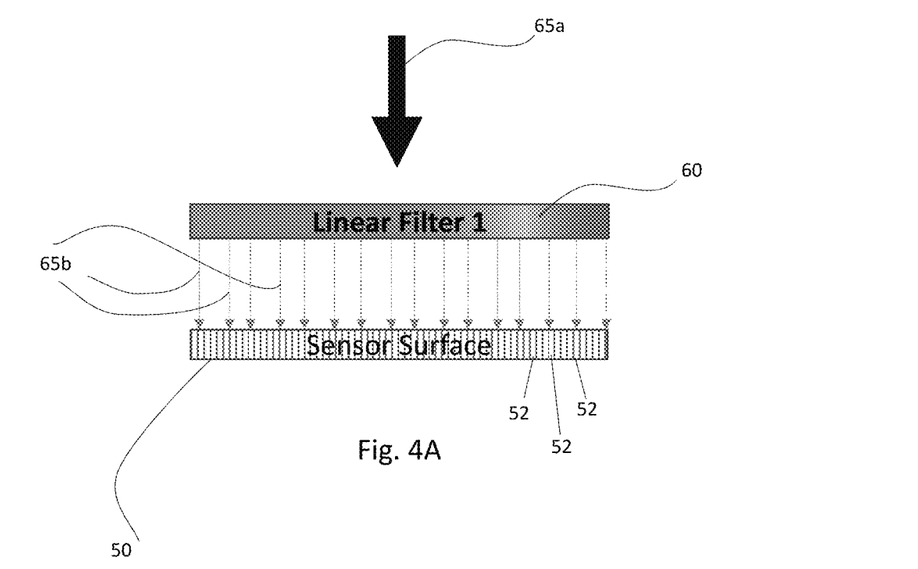
FIG. 4A is a schematic view of a filter arrangement of according to one example of the presently disclosed subject matter.

According to the illustrated example, the detector 30 includes a band pass filter 40, such as a linear variable filter, disposed along the array of pixels and being configured to filter various wavelengths of the spectrum. The filter 40 is configured such that each of the pixels on the array of pixels receives light of a certain wavelength or bandwidth. This way, as shown in FIG. 4A, each pixel provides information regarding parameters of light within a specific wavelength, and the detector 30 provides information regarding each of the wavelengths within the illuminating spectrum.

Consequently, the device 10 allows illuminating a biological sample inside the cuvette with light of a predetermined spectrum and obtain information regarding light absorbance of each of the wavelengths within the illuminated spectrum.

According to another example, each of the pixels in the detector 30 can be provided with a designated filter, such that each pixel receives light of a predetermined wavelength. The pixel array of the detector 30 can be for example as describe in U.S. patent application Ser. No. 16/462,760 "ACTIVE-PIXEL SENSOR ARRAY", the disclosure of which is incorporated herein by reference.

The detector 30 is thus configured for detecting light of a wide spectrum transmitted through the biological sample, and each pixels is configured to detect intensity of one of wavelength within the spectrum. The detector thus obtains a spectral signature of the biological sample including intensities of wavelengths within the spectrum. The spectral signature, i.e. the light absorption of the biological sample in each wavelength, can be used to provide information regarding the substance of the biological sample and facilitate detecting the nature of the molecules in the biological sample.

Although according to the present example the detector 30 is configured to detect light transmitted through the cuvette, according to other example the detector 30 can be configured to detect light reflected from the specimen inside cuvette.

Figure 3A:
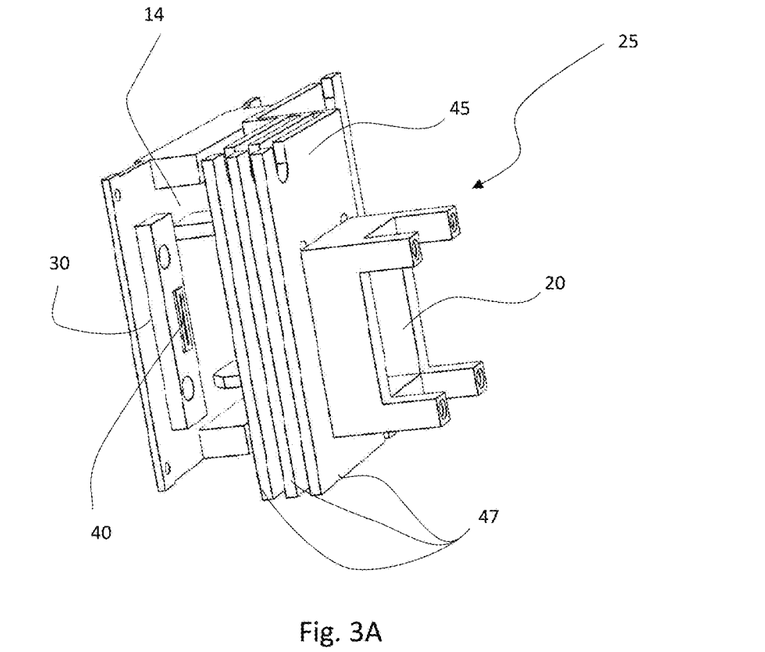
FIG. 3A is a right side view of the optical system of the device of FIG. 1.
Figure 3B:
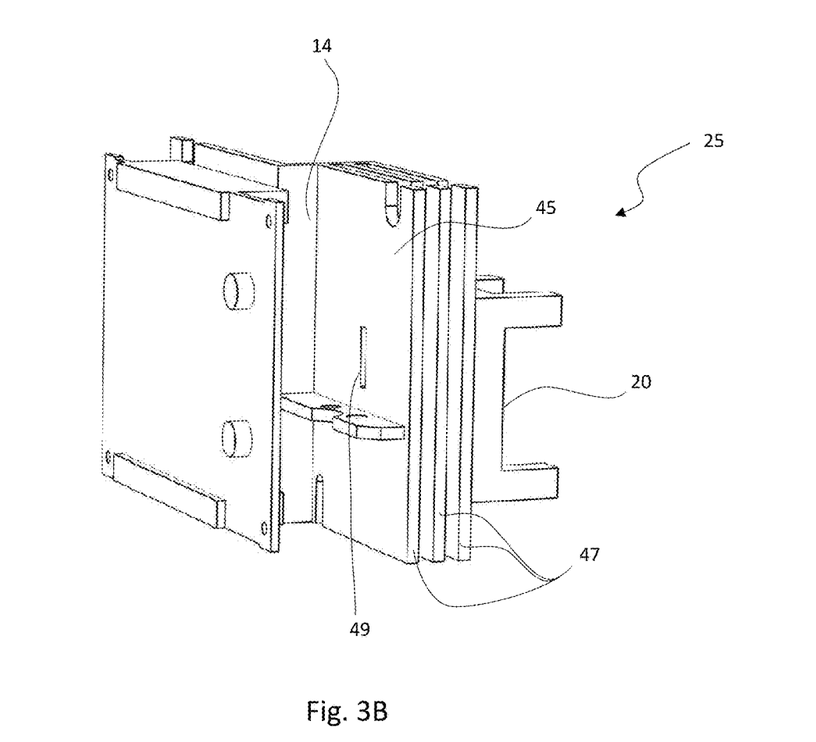
FIG. 3B is a left side view of the optical system of the device of FIG. 1.
Figure 3C:
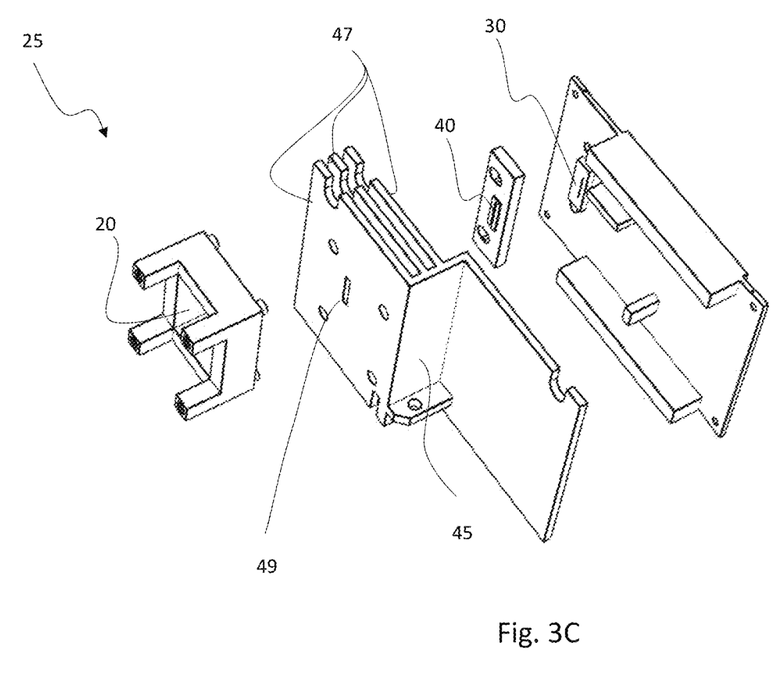
FIG. 3C is an exploded view of the optical system of the device of FIG. 1, showing an optical system in accordance with an example of the presently disclosed subject matter.

Referring to FIGS. 3A to 3C, the optical system 25 of the device 10 can further include an optical guiding member 45 for directing the illumination from the light source to the seat 14 and the cuvette. The optical guiding member 45 is configured to form an even and orthogonal illumination, such that the cuvette is evenly illuminated, and reflections are precluded. According to the illustrated example, the optical guiding member 45 includes an array of blocking walls 47 each having an elongated slit 49, extending along the length of the cuvette. This way, light arrays which are not directed orthogonally to the cuvette are blocked by one of the blocking walls 47. The optical guiding member 45 thus provides an evenly distributed illumination along the cuvette.

According to an example, the detector 30 can be configured to detect light intensity in wavelengths that range between 400 nm and 700 nm and provides 1024 with up-to 12 bit digital values. Each value represents the intensity of each wavelength. These 1024 digital value vectors allow the creation of a high-resolution spectral signature of any tested substance in the range of 400 to 700 nm.

Figure 3D:
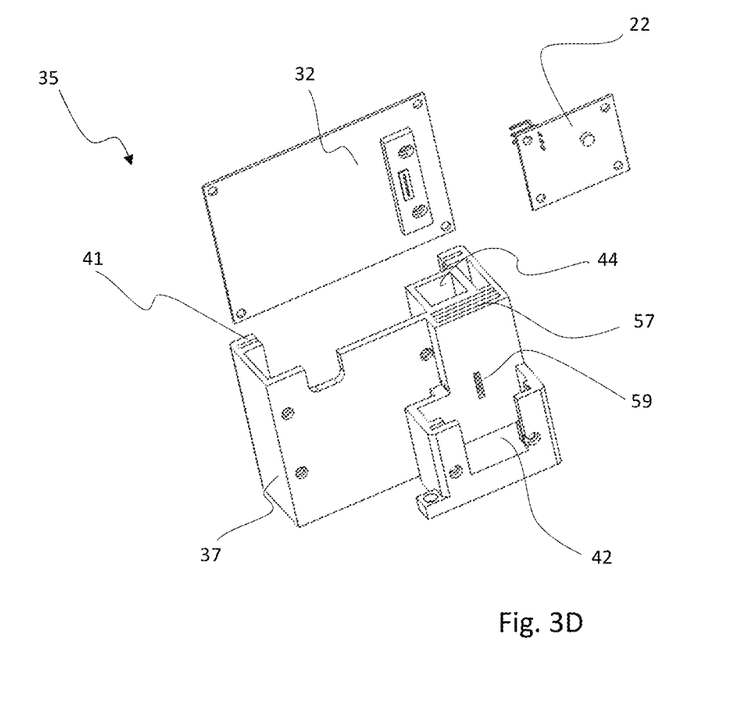
FIG. 3D is an exploded view of the optical system of the device of FIG. 1, showing an optical system in accordance with another example of the presently disclosed subject matter.

As shown in FIG. 3D, according to an example the optical system 35 can be integrated with a single holding member 37 including a seat 44 for holding a cuvette, a light source holder 42 for holding light source module 22, and a detector holder 41 for holding a detector module 32. The holding member 37 further includes an optical guiding member 51, having array of blocking walls 57 each having an elongated slit 59, similar to the optical guiding member of FIG. 3C.

The holding member provides durability and stability of the optical system 35, and hence enhance the accuracy of the spectral analysis.

Making reference to FIG. 4A, the pixel array 50 including a plurality of pixels 52 arranged along a first dimension of the array 50, in parallel with the linear filter 60. The linear filter 60 is configured such that filtering properties thereof vary along a first dimension of thereof. The filtering properties can be such that each location along the first dimension of the filter allows transmitting light of a single wavelength or a narrow bandwidth of wavelengths. This way, the illuminated spectrum 65a impinges on a first surface of the filter 60 and the light arrays 65b which is emitted from the second surface of the filter 60 is divided into uniformly separated wavelength.

It is appreciated that in order to receive the most accurate information in each pixel 52, it is required to ensure that each pixel 52 is exposed only to one of the light rays 65b, such as a single wavelength or a narrow bandwidth of wavelengths within the illuminated spectrum. For that, each pixel 52 is preferably coaxially disposed with respect to the location of the filter configured to transmit the wavelength assigned to the pixel.

Each pixel 52 may however receive light rays 65b from locations on the filter 60 not precisely over that pixel 52. In order to minimize the number of light rays 65b received from other locations of the filter, the filter may be disposed as close as possible to the pixel array 50. This way, each pixel 52 receives light rays 65b only from the location of the filter disposed precisely adjacent the pixel.

In addition, due to the physical nature of the linear filter 60, each location of the filter transmits light rays 65b in a spectrum of wavelengths, however with varying intensities. Such varying intensities can be described as forming a Gaussian curve (shown in FIG. 5), having a peak of one wavelength and other wavelengths around the peak wavelength. It is desirable to minimize the intensities of other wavelengths, so as to provide the respective pixel with a narrow bandwidth of wavelengths.

Figure 4B:
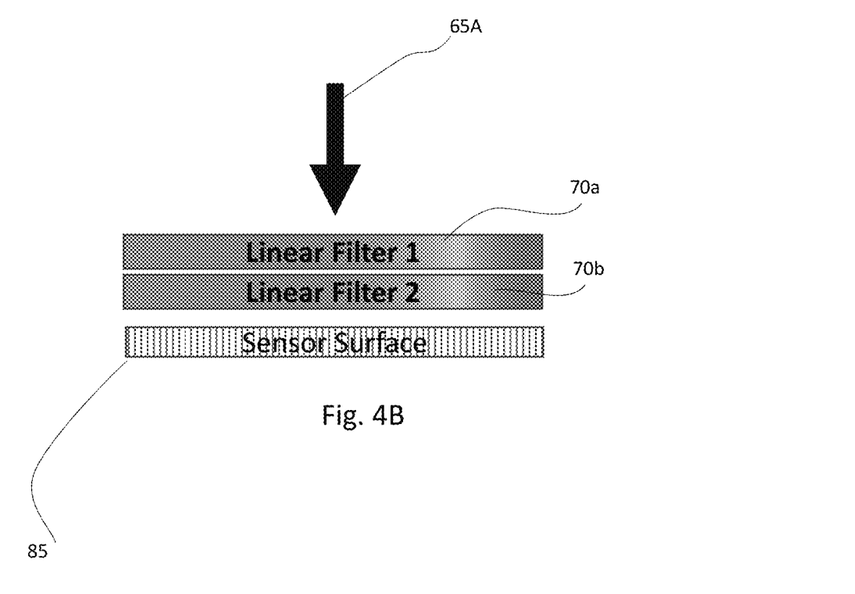
FIG. 4B is a schematic view of a filter arrangement of according to another example of the presently disclosed subject matter.

According to one example, as shown in FIG. 4B, the device may include a first and second filters 70a and 70b, disposed in parallel to one another and in parallel with the pixel array 85. The filters 70a and 70b disposed with respect to one another, such that each location along the first dimension of the first filter 70a is configured to transmit the same wavelength as the corresponding location along the first dimension of the second filter 70b. For example, the location of the first filter 70a which is configured to transmit light rays having a peak wavelength of 520 nm is disposed along the same optical axis as the location of the second filter 70b which is configured to transmit light rays having a peak wavelength of 520 nm. Consequently, the first filter 70a provides a narrow bandwidth with a peak wavelength of 520 nm. The corresponding location of the second filter 70b receives the bandwidth and further narrows the bandwidth by reducing the intensities of wavelengths around the 520 nm peak. This way, light imaging on the corresponding pixel of the pixel array 85 receives light having a peak wavelength of 520 nm while the light of other wavelength is reduced to minimum.

Figure 5:
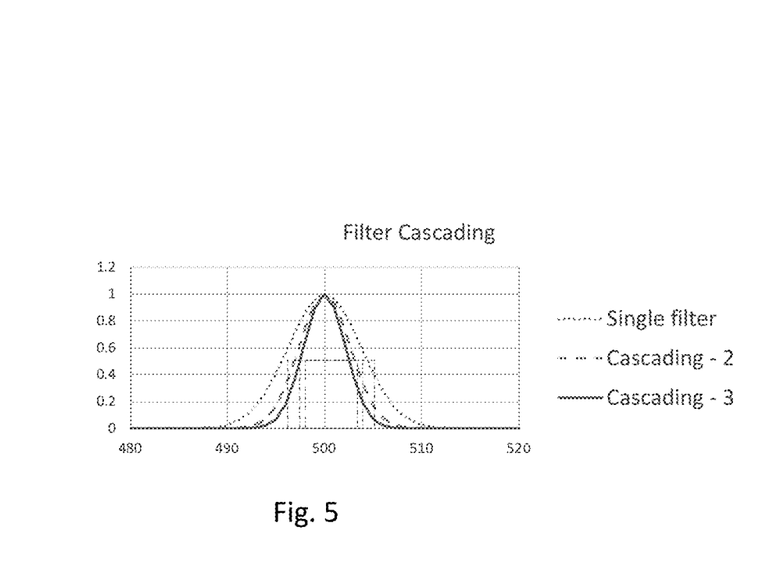
FIG. 5 is a graph illustration of the bandwidths provided by the filter arrangements of FIGS. 4A and 4B.

As shown in the graph of FIG. 5, cascading more than two filters can further narrow the bandwidth and provides each pixel with a more accurately divided spectrum. This way, each pixel provides information regarding the absorbance of a very narrow spectrum and the spectral signature provided by the pixel array is of a higher resolution.

Figure 6A:
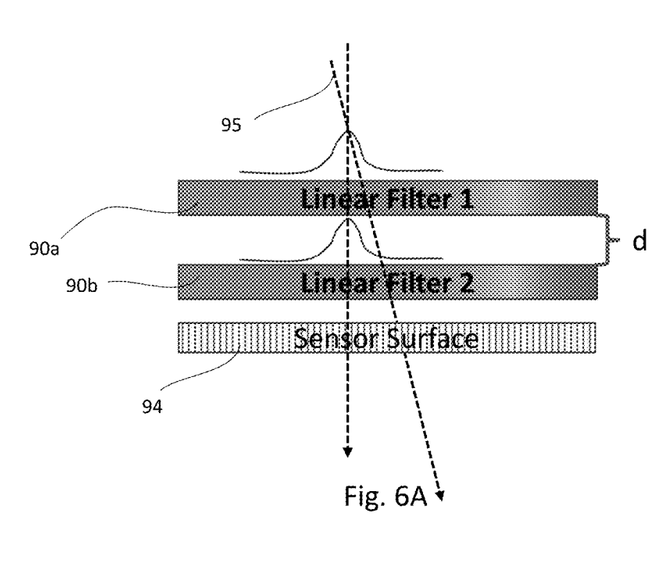
FIG. 6A is a schematic view of a filter arrangement of according to yet another example of the presently disclosed subject matter.

Although, as explained hereinabove, the device can include an optical guiding member for providing a perpendicular illuminated light, some of the light from the cuvettes may reach the filter at an angle. As shown in FIG. 6A, the location of the filter 90a which receives this oblique light ray 95 transmits this oblique light ray 95 towards a pixel 94 which is not coaxially disposed with respect to the location of the filter.

In order to block these oblique light rays, the device can be provided with a second filter 90b disposed such that a space d is formed between the first and second filters 90a and 90b. The space d extends the optical path of the oblique light ray, such that the location of the second filter 90b which the oblique light ray strikes, is far enough from the corresponding location of the second filter 90a. Since, as described above each location of the filters 90a and 90b provides a bandwidth of wavelength, the first filter 90a transmits the oblique light ray in a certain bandwidth. The space d causes the oblique light ray to strike the second filter 90b at a location in which the entire bandwidth is blocked, such that the pixels in the pixel array 94 receive from the second filter 90b only rays from locations of the filters 90a and 90b being disposed on the same optical axis.

Figure 6B:
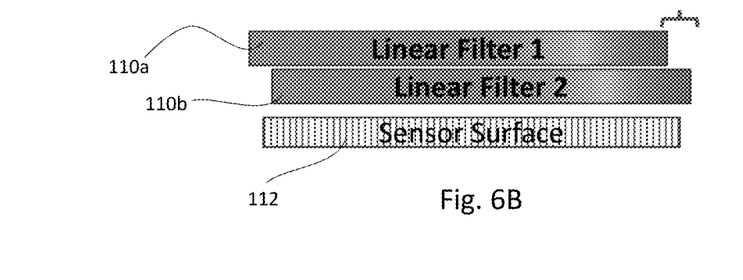
FIG. 6B is a schematic view of a filter arrangement of according to a further example of the presently disclosed subject matter.

As shown in FIG. 6B, according to another example in order to minimize the affect of the bandwidth the filters 110a and 110b can be disposed with a shift with respect to one another along the first dimension of the filters. As a result of the shifting arrangement, a first location of the first filter 110a provides a first bandwidth which strikes a second location of the second filter 110b. The second location of the second filter is shifted with respect to the first location of the first filter 110a. Hence, the second location of the second filter 110b does not correspond to the first location of the first filter 110a, and while the first location provides a first bandwidth, the second location provides a second bandwidth. Thus, the second filter further filters the first bandwidth, and the light that will be transmitted towards the pixel array 112, is only the overlapping portion of the first and second bandwidths.

According to a further example of the presently disclosed subject matter, the device can further include a detector configured for detecting light at a predetermined timeslot. The device can thus be configured for analyzing biological molecules by means of fluorescence. I.e., the detector can be configured to measure light from the biological sample which is received within a predetermined timeslot. This way, a light pulse of a predetermined length can be transmitted towards the biological sample. Since the fluorescence of the sample normally occurs at a delay, the detector can be configured to measure light only after a predetermined time period. Thereby, the detector does not measure the illumination of the light pulse itself, rather the measurement timeslot begins after the light pulse has ended, and the illumination received by the detector is only of the illumination caused by the fluorescence of the substance in the biological sample.

Such as detector can be a time of light detector, for example as described in U.S. patent application Ser. No. 16/462,787—"RANGE IMAGING CAMERA AND A METHOD THEREOF" the disclosure of which is incorporated herein by reference.

It will be appreciated that the fluorescence measurements can be carried out with or without absorbance measurements as described above. For example, the detector can be configured to measure light at two timeslots, at a first timeslot the detector can measure light pulse transmitted through or reflected from the biological sample, and at a second timeslot the detector can measure light caused by the fluorescence of the substance in the biological sample.

According to an example the device can be configured for obtaining a plurality of spectral signatures such as 40,000 per seconds. According to this example, the spectral analysis of the specimen can be derived from the spectral signatures, for example the average of the results of each analysis. This way, the device can compensate for any instability in the specimen in the cuvette.

According to a further example the detector can be configured to allow various configurations of the pixel array. I.e., configuration of the duration of exposure of each pixel, and the number of photodiodes designated for each pixel. Such dynamic pixel arrays are described for example in U.S. patent application Ser. No. 16/236,661 "AN IMPROVED ACTIVE-PIXEL SENSOR ARRAY" and in U.S. patent application Ser. No. 16/236,662—"AN ACTIVE PIXEL ARRAY FOR A TIME OF FLIGHT DETECTOR".

This way, the device can provide a plurality of spectral signatures in various configurations, providing thereby more information regarding the substances in the specimen, and allowing better assessment regarding the existence of viruses or other compounds in the specimen.

According to an example, the device further include a controller configured for analyzing a spectral signature of the compound specimen. The controller can be configured for obtaining a spectral signature of the compound specimen, and for extracting characterizing features of the spectral signature. The characterizing features can be light properties, such as absorbance, of predetermined wavelengths in the illuminated spectrum. The controller can be further configured for comparing the characterizing features with corresponding features stored in a database. The corresponding features include light properties of the predetermined wavelengths of a specimen including a predetermined substance. For example the corresponding features can include light absorbance of certain wavelength of a specimen including a certain virus.

It is appreciated that in order to obtain spectral absorbance of the biological sample, the detector 30 can be calibrated such that each pixel in the array is assigned a certain wavelength within the spectrum. In other words, the detector 30 provides a dataset including the intensity of light received in each pixel. Since each pixel is configured to receive light at a predetermined wavelength, the data set provides the intensities of each wavelength in the illuminated spectrum. In order to obtain this data set, each pixel is assigned a specific wavelength, such that the pixel detects intensity of light in the assigned wavelength. Accordingly, it is required to determine the wavelength which is assigned to each of the pixels in the array. Such calibration can be carried out, for example, by illuminating the array of pixels with a monochromatic light and detecting the pixel which detects the monochromatic light. It is appreciated that this calibration can be repeated by illuminating a series of monochromatic lights until a satisfying calibration is achieved.

According to another example, a calibrating filter can be inserted in the seat of the cuvette, or in other locations between the light source and the detector. The calibration filter can be a multi passband configured to transmit light of certain wavelength or spectrum of wavelength and block other wavelengths. As shown in the illumination graph 115 of FIG. 7, the calibrating filter can be configured to transmit light of wavelengths in a number of ranges such as a first range of 375-410 nm (112a), a second range of 460-490 nm (112b), a third range of 540-560 nm (112c), and a fourth range of 620-650 nm (112d). These ranges can have various widths and can be located in various locations along the visible spectrum.

Figure 7:
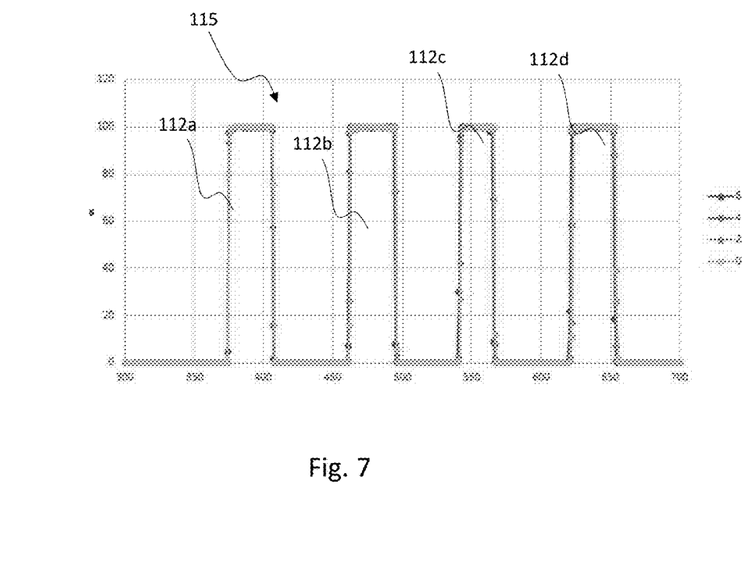
FIG. 7 is a graph showing illumination of the optical system with a calibration filter.

The calibration filter allows determining the pixels of the detector which detect one of the ranges, and thus facilitate calibrating the pixels to the known ranges 112a-112d of the calibration filter.

Figure 8:
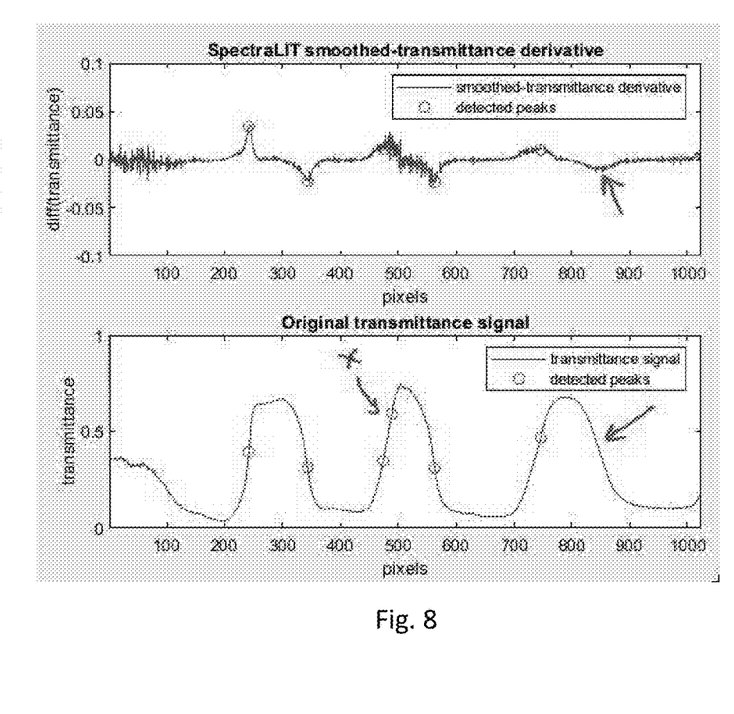
FIG. 8 is a graph showing signal processing of the calibration factors.

It will be understood that the detector may detect the ranges 112a-112d, and the transmittance signal may be uneven. Thus, in order to most accurately determine the wavelengths detected by each pixel, smoothing techniques can be applied, such as by locating peaks in the transmittance signal and applying a derivative function, as shown in FIG. 8.

Thus, the calibration filter illuminating the detector with the ranges 112a-112d, allows determining the pixels which detected each of these ranges. In the illustrated example, where the calibration filter transmits four ranges, the calibration allowed determining the spectral detectability of four pixels, i.e., which wavelengths are detected by each of the four pixels. Since the detector is assumed to be linear, in accordance with the data regarding the wavelength detected by the four pixels, the spectral detectability of the other pixels can be determined. In other words, since the distance between pixels along the detector linearly corresponds to the distance between wavelengths, we can assume that the spectral detectability of pixels between each of the four pixels is linear as well.

Figure 9A:
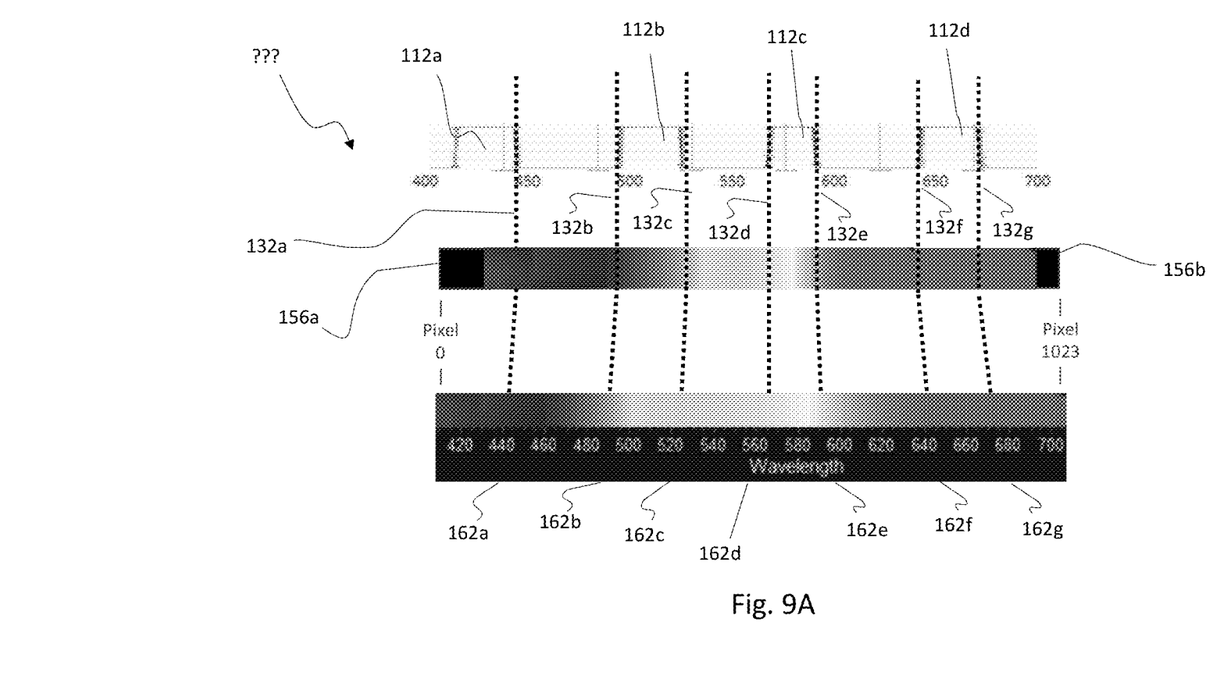
FIG. 9A is a schematic graph showing application of calibration factors according to an example of the presently disclosed subject matter.

For example, as shown in FIG. 9A, a first peak 132a is detected in 450 nm, and the corresponding first pixel 152a is determined. A second peak 132b is detected in 600 nm, and the corresponding second pixel 152b is determined. The spectral detectability of the pixels between first pixel 152a and second pixel 152b is determined, assuming the detector is linear. I.e., the spectral detectability gradually shifts from 450 nm around first pixel 152a to 600 nm around the second pixel 152b. The same calculation is repeated with respect to the other peaks 132c-132g and the corresponding pixels 152c-152g. Thus, detecting the wavelength of each of the pixels 152a-152g provides calibration factor which is then used to determine the corresponding spectral arrangement of the pixel array. The spectral arrangement of the pixel array can be applied on results of biological sample analysis to conclude the spectral signature of the biological sample.

It is noted that the calibration filter may have lower sensitivity at the edges 156a and 156b of the spectrum, for example between 400-420 nm and between 690-700 nm. Thus, the calibration filter does not provide any information regarding the pixels at the corresponding edges of the array. In order to compensate for this lack of data, when applying the calibration factor the spectral arrangement over the pixel array is slightly stretched, such that the spectrum extends over the entire pixel array. As a result, the pixels which provides calibration factor for the specific device are pixels 162a-162g, each of which correspond to one of peaks 132c-132g, and is slightly shifted with respect to pixels 152a-152g detected during the calibration process.

It is appreciated that the calibration process can be carried out on each device, such that later analysis can be calculated in accordance with the calibration factor.

Figure 9B:
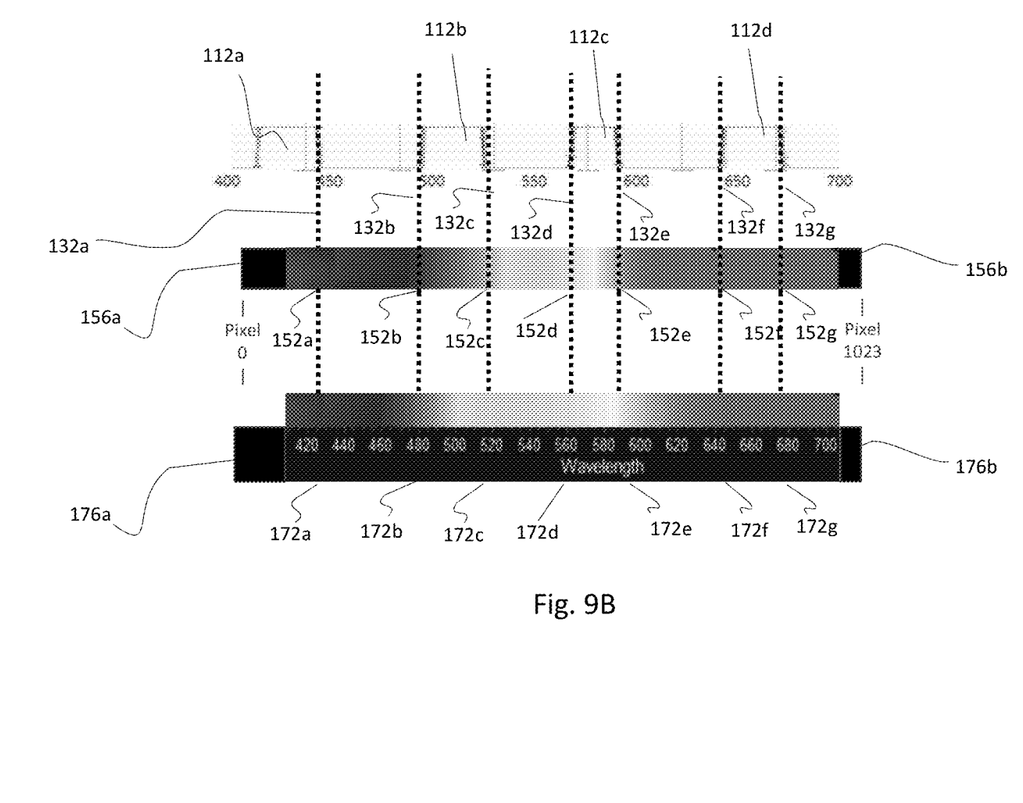
FIG. 9B is a schematic graph showing application of calibration factors according to a further example of the presently disclosed subject matter.

According to another example, as shown in FIG. 9B, a similar calibration process is carried out. Namely, a calibration filter is used for detecting peaks 132c-132g by the corresponding pixels 152a-152g. According to this example however, the lack of data at the edges 156a and 156b of the spectrum is not compensated and the spectral arrangement is not stretched. Rather, the edges of the pixel array are ignored, and the spectral analysis is determined by the signal received in the effective portion of the array without the edges 156*a* and 156*b*. It is appreciated that such method might cause various devices to produce different results for the same biological sample. This is due to the fact that each device has a different ineffective edges 156*a* and 156*b*. Thus, according to this example, a first device is determined to be a master device, according to which the edges of the pixel array are determined. For example, the master device may have ineffective edges 156*a* and 156*b* such that the effective area is 850 pixels, out of the 1024 pixel array. Thus, the effective area for all other devices can be determined to be the same, i.e., 850 pixels with edges of similar size. As a result, the pixels which provides calibration factor for the other devices are pixels 172*a*-172*g*, each of which correspond to one of peaks 132*c*-132*g*, and is only slightly shifted with respect to pixels 152*a*-152*g* detected during the calibration process of the master device. Here the shift is only caused by the differences in the pixels which detect the peaks 132*c*-132*g*, and not by stretching the spectral arrangement over the pixel array.

Those skilled in the art to which the presently disclosed subject matter pertains will readily appreciate that numerous changes, variations, and modifications can be made without departing from the scope of the invention, mutatis mutandis.

The invention claimed is:

1. An apparatus for spectral analysis comprising:
a seat for holding therein a biological sample;
a light source for illuminating the biological sample with a spectrum of light;
a detector configured for detecting light transmitted through or reflected from said biological sample, said detector includes an array of pixels arranged along the length of the detector;
a linear filter including a plurality of locations along a first dimension of the linear filter, each location is configured for transmitting light of a single wavelength or a narrow bandwidth of wavelengths within said spectrum, said linear filter is disposed with respect to said seat such that light transmitted through or reflected from said biological sample, impinges on said plurality of locations; and,
wherein said linear filter is disposed with respect to said array of pixels such that each of the pixels receives light transmitted through one of said locations, such that each of the pixels detects an intensity of narrow bandwidth of wavelengths within the spectrum and such that the entire array of pixels is configured to provide information regarding intensity of each wavelength within the spectrum, and to obtain a spectral signature of said biological sample including intensities of wavelengths within said spectrum.

2. The apparatus of claim 1 wherein the light source is disposed on a first side of the seat and the detector is disposed on a second side of the seat such that an optical path is formed between the light source and the detector.

3. The apparatus of claim 1 wherein the detector includes a band pass filter disposed along the array of pixels and being configured to filter various wavelengths of the spectrum such that each of the pixels on the array of pixels receives light of a certain wavelength or bandwidth.

4. The apparatus of claim 1 further comprising an optical guiding member for directing illumination from the light source to the seat and a cuvette and being configured to form an even and orthogonal illumination, such that the cuvette is evenly illuminated.

5. The apparatus of claim 4 wherein the optical guiding member includes an array of blocking walls each having an elongated slit extending along length of the cuvette such that light arrays which are not directed orthogonally to the cuvette are blocked by one of the blocking walls.

6. The apparatus of claim 1 wherein said linear filter includes a first filter and a second filter, disposed in parallel to one another and in parallel with the pixel array, said first and second filters are disposed with respect to one another, such that each location along a first dimension of the first filter is configured to transmit the same wavelength as corresponding location along first dimension of the second filter.

7. The apparatus of claim 6 wherein said first and second filters are disposed with a space between one another, said space extends the optical path such that oblique light rays from the first filter strike the second filter at a location in which said oblique light rays are blocked.

8. The apparatus of claim 1 wherein said linear filter includes a first filter and a second filter, disposed in parallel to one another and in parallel with the pixel array, said first and second filters are disposed with respect to one another, such that each location along a first dimension of the first filter is configured to transmit the same wavelength as corresponding location along first dimension of the second filter.

9. The apparatus of claim 1 wherein said linear filter includes a first filter and a second filter disposed along an optical path formed between the light source and the detector, said first filter is disposed with a shift with respect to the second filter.

10. The apparatus of claim 1 further comprising a controller configured for analyzing a spectral signature of the biological sample, said controller is configured for obtaining the spectral signature and for extracting characterizing features of the spectral signature.

11. The apparatus of claim 10 wherein the characterizing features are light properties, of predetermined wavelengths in the illuminated spectrum.

12. The apparatus of claim 11 wherein the controller is configured for comparing the characterizing features with corresponding features stored in a database.

13. The apparatus of claim 10 wherein said controller is configured for obtaining a plurality of spectral signatures of said biological sample, and for calculating an average spectral signatures.

14. A method for spectral analysis of a biological sample, the method comprising:
illuminating the biological sample with a spectrum of light;
providing a linear filter including a plurality of locations along a first dimension of the linear filter, each location is configured to transmitting light of a single wavelength or a narrow bandwidth of wavelengths within said spectrum, said linear filter is disposed with respect to said seat such that light transmitted through or reflected from said biological sample, impinges on said plurality of locations;
providing a detector for detecting light transmitted through or reflected from said biological sample, said detector includes an array of pixels arranged along the length of the detector;
wherein said linear filter is disposed with respect to said array of pixels such that each of the pixels receives light transmitted through one of said locations, such that each of the pixels detects an intensity of narrow bandwidth of wavelengths within the spectrum and such that the entire array of pixels is configured to provide information regarding intensity of each wavelength within the spectrum, and to obtain a spectral signature of said biological sample including intensities of wavelengths within said spectrum.

15. The method of claim 14 further comprising obtaining a spectral signature of the biological sample and extracting characterizing features of the spectral signature.

16. The method of claim 15 further comprising comparing the characterizing features with corresponding features stored in a database.

17. The method of claim 14 further comprising calibrating the detector by a calibrating filter configured to transmit filtered light of certain wavelength or spectrum of wavelength and determining location of at least two pixels in the detector which detect the filtered light.

* * * * *